Oct. 29, 1935.    J. B. FLYNN ET AL    2,019,127
SCREEN FOR AN AUTOMOTIVE VEHICLE
Filed April 16, 1934    3 Sheets-Sheet 1
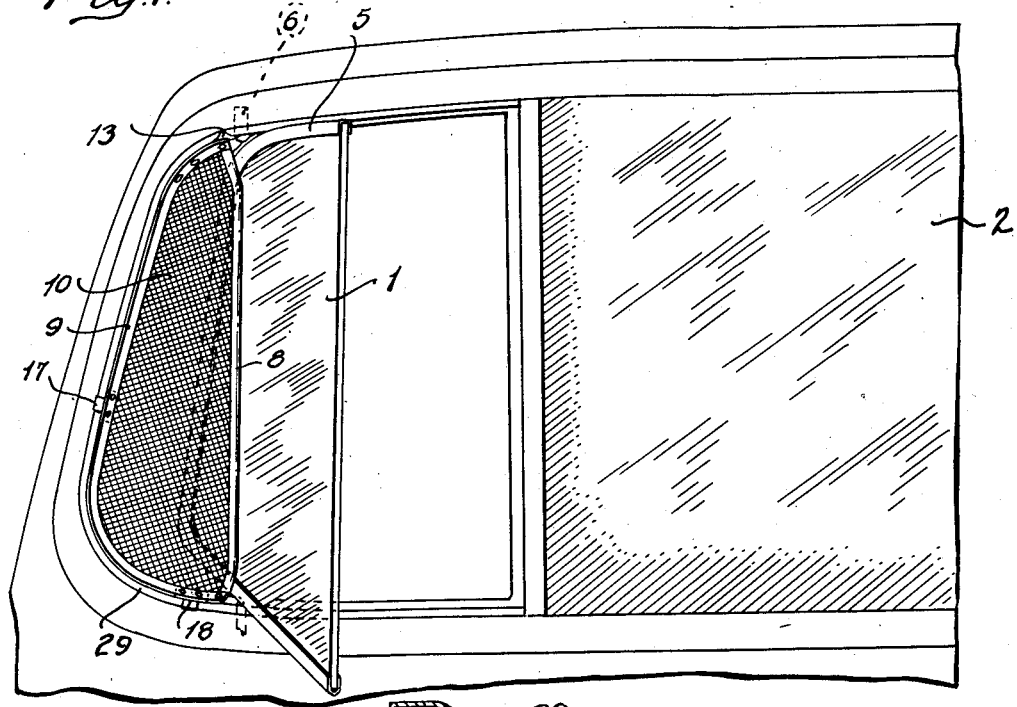
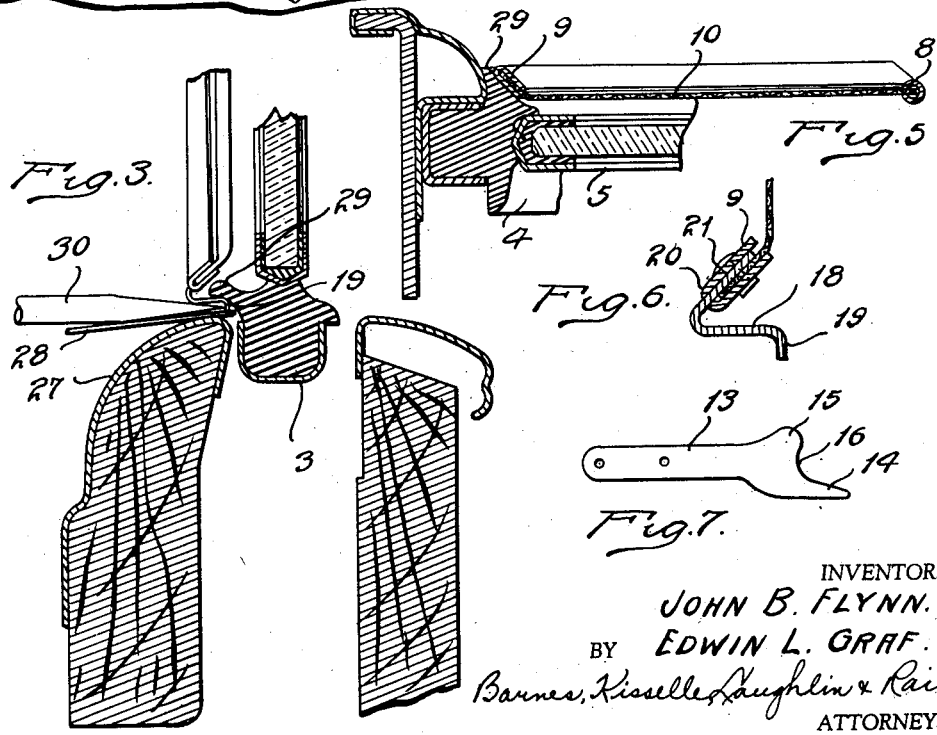
INVENTORS.
JOHN B. FLYNN.
BY EDWIN L. GRAF.
Barnes, Kisselle, Laughlin & Raisch
ATTORNEYS.

Oct. 29, 1935.  J. B. FLYNN ET AL  2,019,127
SCREEN FOR AN AUTOMOTIVE VEHICLE
Filed April 16, 1934   3 Sheets-Sheet 2
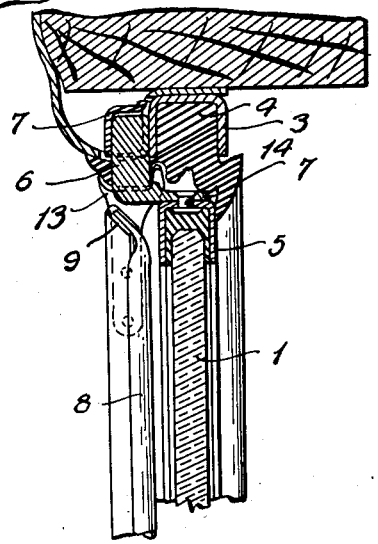
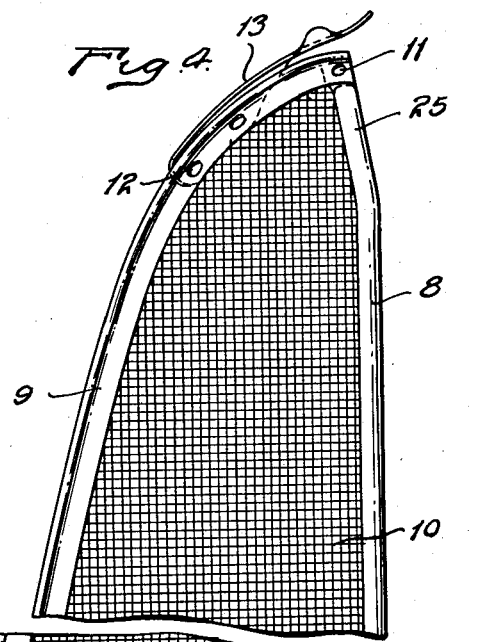
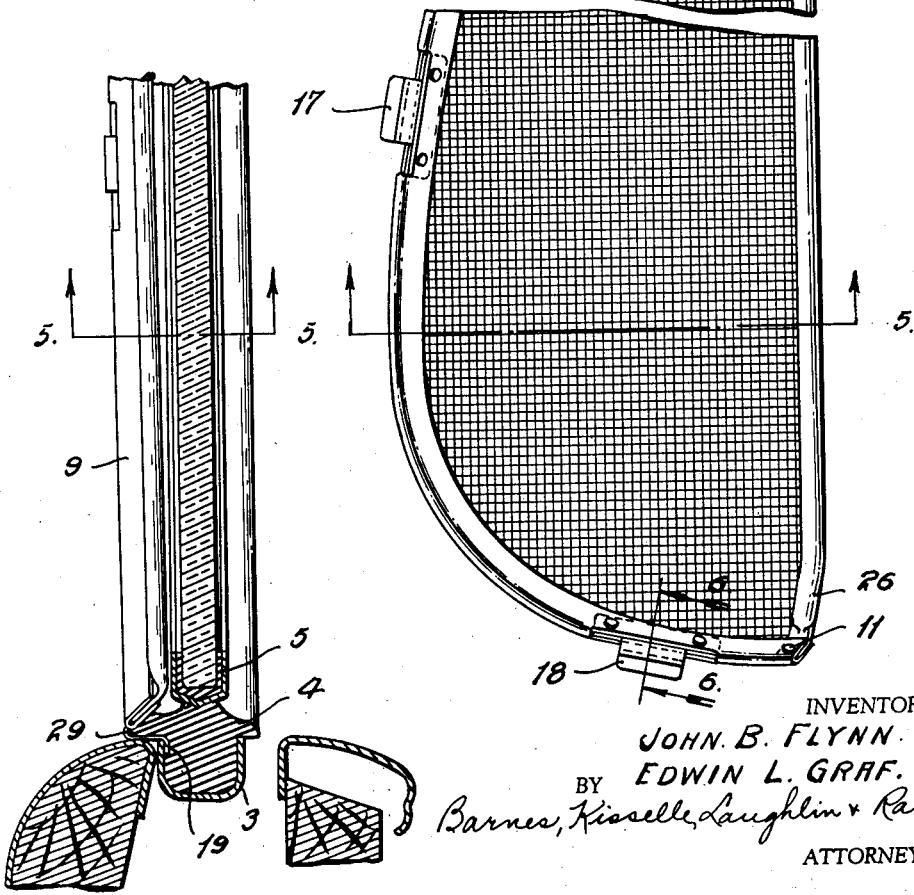
INVENTORS.
JOHN B. FLYNN.
EDWIN L. GRAF.
BY Barnes, Kisselle, Laughlin & Raisch
ATTORNEYS.

Oct. 29, 1935.   J. B. FLYNN ET AL   2,019,127
SCREEN FOR AN AUTOMOTIVE VEHICLE
Filed April 16, 1934   3 Sheets-Sheet 3
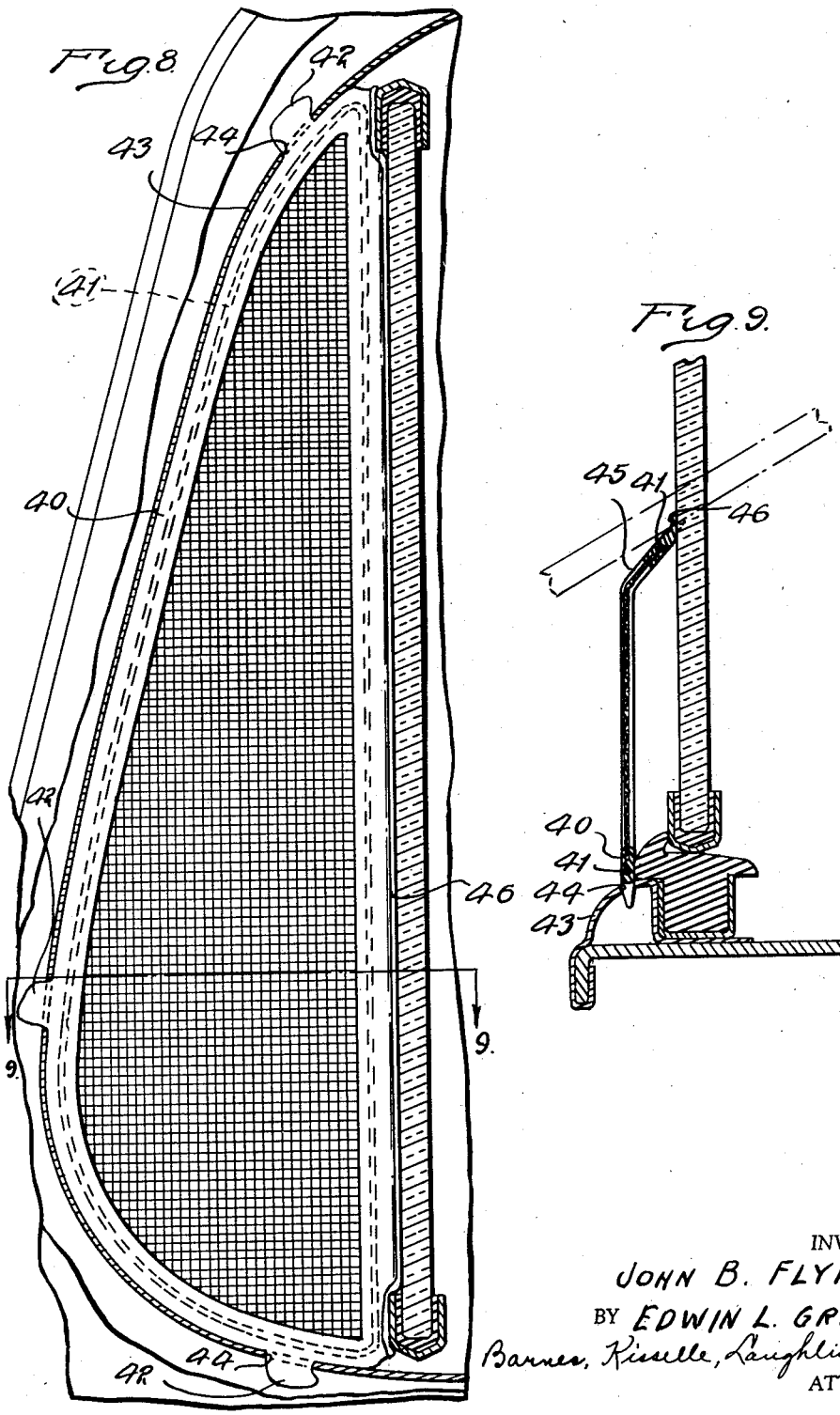
INVENTORS.
JOHN B. FLYNN.
BY EDWIN L. GRAF.
Barnes, Kisselle, Laughlin & Raisch
ATTORNEYS.

Patented Oct. 29, 1935

2,019,127

UNITED STATES PATENT OFFICE 2,019,127

SCREEN FOR AN AUTOMOTIVE VEHICLE

John B. Flynn and Edwin L. Graf, Detroit, Mich., assignors to Ternstedt Manufacturing Company, Detroit, Mich., a corporation of Michigan Application April 16, 1934, Serial No. 720,749

6 Claims. (Cl. 156—14)

This invention relates to a screen for an automotive vehicle.

This invention is more particularly concerned with a screen for the opening in front of the pivoted panel of the type used in the well-known Fisher no draft ventilation system. The Fisher no draft ventilation system is described and claimed in copending application Serial No. 644,622, filed November 28, 1932.

It is the object of this invention to produce a screen for that portion of the opening in front of the pivots of the swinging panel in the Fisher no draft ventilation system which is neat in appearance and easy to install.

In the drawings:

Fig. 1 is a fragmentary side elevation of the window showing the screen in place.

Fig. 2 is a vertical section through the window showing an end view of the screen in place.

Fig. 3 is a detail illustrating the manner of assembling the screen in the window opening.

Fig. 4 is a detail of the screen.

Figs. 5 and 6 are sections along the lines 5—5 and 6—6 respectively of Fig. 4.

Fig. 7 is a detail of the upper screen clip.

Fig. 8 is a side elevation of a modified form of the screen.

Fig. 9 is a section along the line 9—9 of Fig. 8.

Referring more particularly to the drawings there is shown a window opening having the front portion closed by a swinging panel 1 and the rear portion closed by the sliding panel 2, such as shown, described and claimed in the above mentioned copending application. The panel 1 is arranged to swing upon an upright axis between its rear and front edges. The panel is swingably mounted within the channel 3 which is secured in the window opening in any suitable manner such as by screws (not shown). The channel member 3 has secured therein the rubber weatherstrip 4 which seals the front, top and bottom edges of the swinging panel 1 when closed. The top, bottom and front edges of the swinging panel 1 are provided with a U frame 5. The panel 1 is pivoted at its top edge by pin 6 which is riveted or otherwise secured to the top of the frame 5 as at 7. The pin 6 is rotatably mounted in the socket 7 which is riveted or otherwise suitably secured to the channel 3. The panel 1 is pivotally supported at its bottom edge on a vertical shaft, not shown, which is connected with a window regulator such as shown in copending application Serial No. 670,248, which has matured into Patent No. 1,996,572, dated April 2, 1935.

The screen comprises an outer frame, the rear edge 8 of which is tubular, as shown in Fig. 5. The tubular rear edge frame member 8 has its top and bottom ends 25 and 26 bent forwardly to accommodate the frame 5 for the swinging panel when turned forwardly to scoop position.

The curved front portion 9 (which includes the top, bottom and front edges) of the frame comprises a strip of metal bent back upon itself to form a channel with the screen mesh 10 clamped between the side walls. The tubular rear edge 8 of the screen frame is riveted to the front portion of the frame as at 11. It will be noted that the front portion 9 of the screen frame is bent outwardly from the plane of the screen mesh 10 at an angle roughly about 45°. The advantage of arranging the front portion 9 of the screen frame at an angle to the plane of the wire mesh 10 is brought out below.

The frame portion 9 has riveted thereto, as at 12, the hook 13. The hook 13 (shown in detail Fig. 7) is preferably made of spring metal or spring steel and comprises a prong 14, a heel 15, and a socket portion 16. The purpose of the hook 13, as brought out clearly in Fig. 2, is that of securing the upper end of the screen in the window opening by engaging the pivot pin 6 upon which the panel 1 swings. The front portion 9 of the frame is also provided with a clip 17 located along the front edge of the frame a little below the middle and another clip 18 secured to the frame along its bottom edge. The clips 17 and 18 are similar and are shown in detail in Fig. 6. The clip 18 is provided with a hook portion 19 arranged to hook behind the outer wall of the weatherstrip channel 3 and a portion 20 which is secured to the frame 9 by the rivet 21.

The screen may be installed in the window opening as follows: The swinging panel 1 is swung partly open to a position such as shown in Fig. 1 to permit easy access to the sealing rubber 4. At this time the hook 13 is engaged behind the top pivot 6 and beneath the rubber 4, as clearly shown in Fig. 2, with the pivot pin 6 fitted snugly against the socket 16. To protect the finish on the reveal 27 a thin strip of metal or fiber 28 is inserted under the lip 29 of the weatherstrip at the location of the clips 17 and 18. The clip 18 is pushed inwardly by a suitable instrument, such as the screw-driver 30, until the hook end 19 engages between the rubber and the outer wall of the channel 3, as shown in Fig. 2. The center clip 17 is pressed into position in the same manner as the lower clip 18.

Inasmuch as the upper hook 13 is made of spring metal or spring steel it yields as the lower clip is being pressed into place. The yieldability of the hook 13 thus not only facilitates the assembly of the screen into the window opening but also assists in holding the screen against rattling after assembled in the window opening.

It will be noted that the inclining of the front portion 9 of the screen frame at an angle to the plane of the wire mesh 10 causes the front portion 9 of the frame to fit snugly against the lip 29 of the weatherstrip throughout the length of the frame member 9. This inclining of the frame 9 inwardly of the window opening not only makes a neater assembly but also materially lessens the amount of blind spot created by the screen frame. This feature of inclining the frame 9 relative to the plane of the wire mesh 10 also permits the frame portion 9 to flex or bend in the necessary instances in assembling the screen in the window opening, especially after the hook 13 has been positioned and while clip 18 is being pressed into position as shown in Fig. 2. The tubular structure of the rear frame edge member 8 permits this member to flex along with the front member 9 of the frame. By inclining frame portion 9 to the plane of the wire mesh bending or flexing of this portion is facilitated because the bending stress which may occur in some instances during assembly is exerted against the face of member 9 rather than against the edge.

In the form of screen shown in Figs. 8 and 9 the screen is provided with a rubber frame 40 which is molded around its periphery. If desired the rubber frame may be strengthened by molding therein the piano wire 41. The rubber frame 40 is provided with three spaced fingers 42. The reveal 43 is provided with three spaced openings 44 which receive the fingers 42 for holding the screen in place. The fingers 42 are crowded or pressed into the openings 44 and thus securely hold the screen in place. The screen is bent adjacent its rear edge to provide an angled portion 45 which permits the lip 46 of the rear vertical edge of the rubber frame to fit snugly against, and in sealing relation with, the swinging panel when closed as well as when thrown open to ventilating position as shown.

We claim:

1. In a window assembly of the type having a swinging panel pivoted at its top and bottom edges between its front and rear edges, a weatherstrip for sealing the top, bottom and front edges of the swinging panel, and a channel for holding the weatherstrip, a screen for that portion of the window opening forward of the pivots of the swinging panel, the said screen having a hook at its top for interengagement with the top pivot of the swinging window and a clip at its bottom edge for interengaging the weatherstrip channel.

2. In a window assembly of the type having a swinging panel pivoted at its top and bottom edges between its front and rear edges, a weatherstrip for sealing the top, bottom and front edges of the swinging panel, and a metal channel for holding the weatherstrip secured in the window opening, a screen for that portion of the window opening forward of the pivots of the swinging panel, the said screen having a resilient hook at its top for engaging the top pivot of the swinging window between the weatherstrip and the top edge of the swinging panel, and a clip with a hooked end for hooking over the side wall of the weatherstrip channel beneath the weatherstrip whereby the said resilient hook and clip hold the screen in place.

3. A window screen assembly for a vehicle body window opening having a pivoted panel therein comprising a weatherstrip secured in said opening for sealing an edge of the panel when in closed position, a screen extending along and from said weatherstrip comprising a wire mesh and a frame therefor, the portion of the said frame which extends along the weatherstrip comprising a flat strip inclined relative to the plane of the wire mesh and lying flatly against the weatherstrip, and means for holding the screen in the window opening.

4. A screen assembly for a ventilating window assembly having a swinging panel pivoted at its top and bottom edges somewhat to the rear of its front edge comprising a weatherstrip for sealing the front, top and bottom edges of the said panel, a screen for the portion of the window opening forward of the pivots of the swinging panel including a frame and a web of wire mesh secured to the said frame, the front portion of the said frame extending along the periphery of the window opening from adjacent the top pivot to adjacent the lower pivot and comprising a flat strip inclined relative to the plane of the wire mesh and positioned flush against the face of the weatherstrip to thereby reduce the blind spot, and means for securing the screen in position.

5. A screen assembly for a ventilating window assembly having a swinging panel pivoted at its top and bottom edges somewhat to the rear of its front edge comprising a weatherstrip for sealing the front, top and bottom edges of the said panel, a screen for the portion of the window opening forward of the pivots of the swinging panel including a frame and a web of wire mesh secured to the said frame, the said frame having a front portion in the form of a flat metal strip extending along the periphery of the window opening from adjacent the top pivot to adjacent the lower pivot of the swinging panel and inclined relative to the plane of the wire mesh and positioned flush against the face of the weatherstrip and a rear flexible portion extending approximately vertically from the top of the window opening to the bottom, a hook secured to the top of the frame for interengaging the top pivot of the window panel, and a clip secured to the bottom edge of the frame for engaging under the weatherstrip, whereby the assembly of the screen in the window opening is facilitated by the flexibility of the frame.

6. A screen assembly for a ventilating window assembly having a swinging panel pivoted at its top and bottom edges somewhat to the rear of its front edge comprising a weatherstrip for sealing the front, top and bottom edges of the said panel, a metal channel secured in the window opening for holding said weatherstrip, a screen for the portion of the window opening forward of the pivots of the swinging panel including a frame and a web of wire mesh secured to the said frame, the said frame having a front portion in the form of a flat metal channel clamped to the edge of the screen, said flat metal channel extending along the periphery of the window opening from adjacent the top pivot to adjacent the lower pivot of the swinging panel and inclined relative to the plane of the wire mesh and positioned flush against the face of the weatherstrip, and a rear flexible metal portion extending approximately vertically from the top of the window opening to the bottom, a hook secured to the top of the frame for interengaging the top pivot of the window panel, and a clip secured to the bottom edge of the frame for interengaging the weatherstrip channel beneath the weatherstrip, whereby the assembly of the screen in the window opening is facilitated by the flexibility of the frame.

JOHN B. FLYNN.
EDWIN L. GRAF.